UNITED STATES PATENT OFFICE.

ROBERT WILHELM STREHLENERT, OF DJURSHOLM, SWEDEN, AND FRIEDRICH REUBOLD, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

CELLULOSE COMPOUND AND PROCESS OF MAKING THE SAME.

No. 812,098.      Specification of Letters Patent.      Patented Feb. 6, 1906.

Application filed September 8, 1905. Serial No. 277,498.

*To all whom it may concern:*

Be it known that we, ROBERT WILHELM STREHLENERT, residing at Djursholm, a subject of the King of Sweden and Norway, and FRIEDRICH REUBOLD, doctor of philosophy and chemist, residing at Ludwigshafen-on-the-Rhine, in the Kingdom of Bavaria, German Empire, a subject of the King of Bavaria, have invented new and useful Improvements in Cellulose Compounds and Processes of Making the Same, of which the following is a specification.

This invention relates to the manufacture and production of a new form of acetyl cellulose.

We have discovered that cellulose in the form of cotton-wool can be easily, smoothly, and satisfactorily acetylated by treatment with acetic anhydrid and sulfuric acid in the presence of an indifferent organic solvent which does not dissolve acetylated cellulose—such, for instance, as benzene, toluene, and ether. The cotton-wool may be treated in the dry state, although it is preferable to treat it in a damp state, as then the reaction proceeds better and the operation can be conducted at a lower temperature and less sulfuric acid is necessary. As acetylated cellulose is soluble in acetic anhydrid and in glacial acetic acid, it was necessary when working according to the old method to dilute the solution obtained with a considerable amount of water or alcohol in order to precipitate the acetylated product, and consequently the acetic anhydrid and also the glacial acetic acid formed were greatly decreased in value owing to their dilution. By allowing the acetylation, however, to take place in the presence of an amount of an indifferent organic solvent, such that the resulting mixture of solvent, acetic anhydrid, and glacial acetic acid does not dissolve the acetylated cellulose, this latter can be filtered or pressed off and acetic anhydrid and glacial acetic acid can be obtained from the liquid by distillation. When working by the old method, the acetylated product always required to be precipitated from solution, (and spun afterward,) and since it was obtained as a viscous gelatinous mass it was almost impossible to wash it free from the acetylating liquid. However, when acetylating cotton-wool in the presence of an indifferent organic solvent the acetylated cellulose obtained is in a new form and constitutes a new product. It retains the form of the original unacetylated product—that is, it remains fibrous and can be very easily washed and obtained in a pure state. Instead of acetic anhydrid acetyl chlorid can be used, and instead of sulfuric acid an organic sulfo-acid or a phosphoric acid can be used.

The following examples will serve to further illustrate the nature of our invention and the method of carrying it into practical effect; but our invention is not confined to these examples. The parts are by weight.

Example 1: Mercerize one hundred (100) parts of purified cotton-wool by means of caustic soda, wash it free from alkali, and press it until it contains from about ten (10) to twenty (20) per cent. of water, and then introduce it into a mixture of four hundred (400) parts of acetic anhydrid, one and a half (1.5) parts of concentrated sulfuric acid, and fifteen hundred (1,500) parts of benzene, and heat the whole gradually in a vessel provided with a reflux condenser to a temperature of from seventy to seventy-five degrees centigrade (70–75° centigrade) and maintain it at this temperature until a test portion of the product is completely soluble in chloroform. The acetylated cotton-wool can be pressed and washed free from the acetylating liquid and then dried. The acetylated cellulose so obtained is soluble in chloroform, anilin, glacial acetic acid, and hot nitrobenzene.

Example 2: Heat ten (10) parts of dry cotton-wool (from which any greasy matter has been removed) with a mixture of fifty (50) parts of acetic anhydrid, two and a half parts (2.5) of concentrated sulfuric acid, and one hundred and fifty (150) parts of toluene at a temperature of from seventy to eighty degrees centigrade, (70°–80° centigrade.) As soon as a test portion is soluble in chloroform the acetylation is complete, and the product can be separated off, pressed, washed, and dried.

The acetyl cellulose resembles cotton-wool in appearance, but has a hard feel and is brittle. It is soluble in chloroform and in acetone and is insoluble in water.

Example 3: Soak one hundred (100) parts of cotton-wool (which has been freed from any greasy matter) in dilute sulfuric acid containing about six (6) per cent. of $H_2SO_4$, and then press the cotton-wool until about ten (10) parts of the dilute acid remain in the press-cake. Introduce the cotton-wool so treated into a mixture of three hundred (300) parts of acetic anhydrid and eleven hundred (1,100) parts of benzene. Shake this frequently for a period of about twelve (12) hours, and then heat the whole in a reflux apparatus on the water-bath at a temperature of from sixty to sixty-five degrees centigrade (60°–65° centigrade) until a test portion is soluble in chloroform. Then press off the acetylated cellulose, remove the excess of acid by means of warm dilute sodium carbonate solution, and wash and dry.

Now what we claim is—

1. The process for the production of acetyl cellulose which consists in treating cellulose with an acetylating agent and with an acid which assists in promoting the reaction, in the presence of an indifferent solvent so that the acetyl cellulose remains undissolved.

2. The process for the production of acetyl cellulose which consists in treating cellulose with acetic anhydrid and with dilute sulfuric acid in the presence of an indifferent solvent so that the acetyl cellulose remains undissolved.

3. The process for the production of acetyl cellulose which consists in treating cellulose with acetic anhydrid and with dilute sulfuric acid in the presence of benzene so that the acetyl cellulose remains undissolved.

4. As a new article of manufacture a new form of acetyl cellulose which resembles cotton-wool in appearance, but has a hard feel and is brittle, is soluble in chloroform and acetone, and insoluble in water.

In testimony whereof we have hereunto set our hands in the presence of two subscribing witnesses.

ROBERT WILHELM STREHLENERT.
   FRIEDRICH REUBOLD.

Witnesses to Robert Wilhelm Strehlenert's signature:
 CARL TRIBERG,
 EDWARD L. ADAMS.

Witnesses to Friedrich Reubold's signature:
 J. ALEC. LLOYD,
 JOS. H. LEUTE.